United States Patent
Savjani et al.

(10) Patent No.: US 8,489,517 B2
(45) Date of Patent: Jul. 16, 2013

(54) METHOD, SYSTEM, AND STORAGE DEVICE FOR CLIQUE BASED SOCIAL NETWORKING AND SOCIAL GRAPHING

(75) Inventors: Rajen Savjani, El Lago, TX (US); Felipe Villasenor, Houston, TX (US)

(73) Assignee: Cachinko LLC, Houston, TX (US)

( * ) Notice: Subject to any disclaimer, the term of this patent is extended or adjusted under 35 U.S.C. 154(b) by 833 days.

(21) Appl. No.: 12/414,291

(22) Filed: Mar. 30, 2009

(65) Prior Publication Data

US 2009/0299785 A1 Dec. 3, 2009

Related U.S. Application Data

(60) Provisional application No. 61/040,679, filed on Mar. 30, 2008.

(51) Int. Cl.
*G06Q 10/00* (2012.01)
*G06Q 99/00* (2006.01)

(52) U.S. Cl.
USPC .......................... 705/321; 705/319

(58) Field of Classification Search
USPC .......................... 705/320, 321, 319
See application file for complete search history.

(56) References Cited

U.S. PATENT DOCUMENTS

| | | | |
|---|---|---|---|
| 7,246,164 B2 | 7/2007 | Lehmann | |
| 7,725,492 B2 * | 5/2010 | Sittig et al. | 707/784 |
| 8,010,460 B2 * | 8/2011 | Work et al. | 705/319 |
| 8,036,924 B2 * | 10/2011 | Putnam et al. | 705/7.12 |
| 2005/0197846 A1 * | 9/2005 | Pezaris et al. | 705/1 |
| 2006/0100919 A1 * | 5/2006 | Levine | 705/11 |
| 2006/0116894 A1 | 6/2006 | DiMarco | |
| 2006/0212305 A1 * | 9/2006 | Bogle et al. | 705/1 |
| 2006/0292541 A1 * | 12/2006 | Ehmann | 434/350 |
| 2007/0185757 A1 * | 8/2007 | Subramanian | 705/10 |

OTHER PUBLICATIONS

Cooper, Natalie. Spotlight on . . . recruiting through social networks. Personnel Today; Sep. 18, 2007; ProQuest Central. p. 69.*
Cone, Edward. Social Networks at Work Promise Bottom-Line Results. CIO Insight. 86. Oct. 2007.*
Written Opinion and International Search Report dated Jun. 18, 2009 from the U.S. Receiving Office of the Patent Cooperation Treaty.

* cited by examiner

*Primary Examiner* — Jonathan Ouellette
*Assistant Examiner* — Amanda Kirlin
(74) *Attorney, Agent, or Firm* — Hulsey, P.C.; Loren T. Smith; William N. Hulsey, III

(57) ABSTRACT

A method, system, and storage device for clique based social networking and social graphing allowing users to create one or more networks each containing one or more connections, create postings or other information that trickles down to other users according to a set of rules wherein certain connections must be present to be in-network to a primary user.

45 Claims, 6 Drawing Sheets

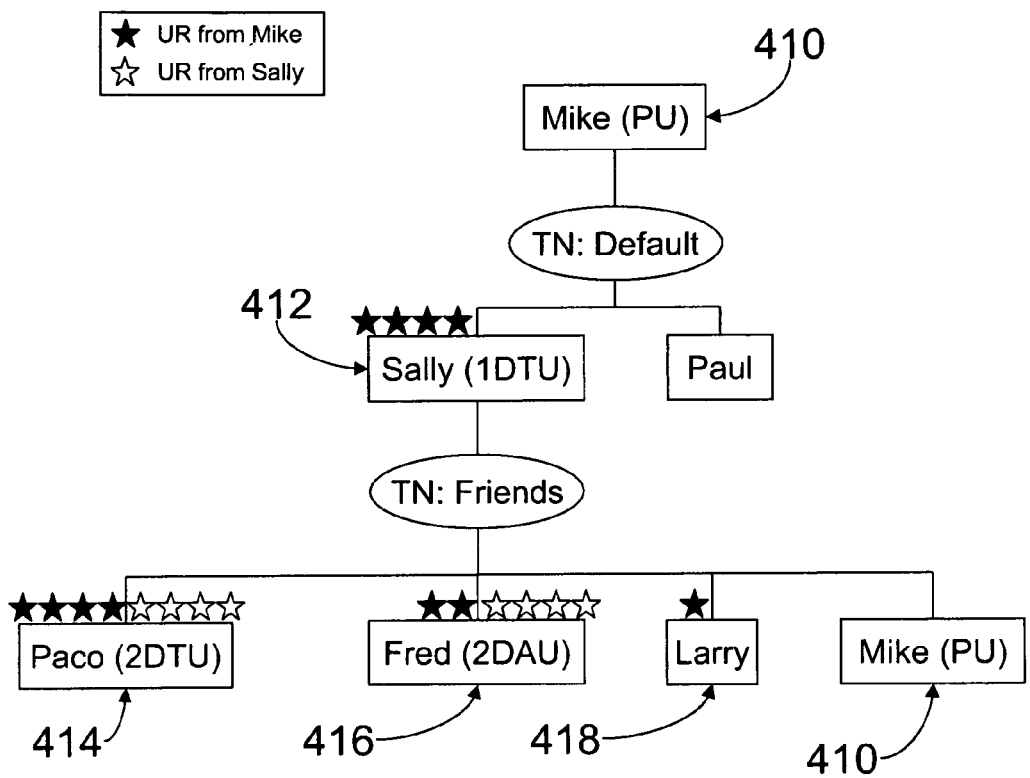

METHOD, SYSTEM, AND STORAGE DEVICE FOR CLIQUE BASED SOCIAL NETWORKING AND SOCIAL GRAPHING

RELATED APPLICATIONS

This application claims the benefit of priority to U.S. Provisional Patent Application No. 61/040,679 entitled "A METHOD, SYSTEM, AND STORAGE DEVICE FOR JOB POSTING, MATCHING, AND REFERRAL" filed Mar. 30, 2008.

FIELD OF THE INVENTION

The disclosed subject matter relates primarily to systems and methods for job posting and matching services.

BACKGROUND OF THE INVENTION

Generally, traditional job posting services maintain databases of job positions and job seekers (e.g. Monster.com™). The job positions are posted by employers seeking to hire new employees. Whereas the job applicants search the job positions and submit their information to the employer. Conversely, the employer can search the job applicant database in order to find potential candidates.

One of the problems with the traditional job posting service is it only allows employers to disseminate their job postings to people actively seeking new employment. Only job seekers who are actively seeking new employment would search and apply for a position listed on a traditional job posting service. Consequently, the job postings are seen by a very small percentage of the total workforce. Furthermore, the only way to increase the number of potential job applicants is through traditional marketing which is very costly.

More recently, professional social networking styles of job posting services have come into the main stream. Most of these professional social networking services use a degree of separation ("DoS") style of logic. Each "level" of group away from a particular person is a degree of separation ("DoS") (this is similar to a family tree). For example, in FIG. 1, user A 100 invites users B1 102, B2 104, and B3 106 (collectively "B Users"); user B2 104 invites users C1 108 and C2 110 (collectively "C Users"); and user C1 108 invites users D1 112 and D2 114 (collectively "D Users"). From A's 100 perspective, the B Users are one (1) DoS, the C Users are two (2) DoS, and the D Users are three (3) DoS away from A 100. Therefore, if the system allowed for a user to converse with a person up to three DoS away, A 100 could disseminate a job posting with all the parties; however, if the system only allowed communication up to two DoS, then the D Users would not receive the job posting because they are three (3) DoS away from A 100. Extending the DoS example, from C1's 108 perspective, D1 112, D2 114, and B2 104 are all one (1) DoS away but C2 110 is two (2) DoS away because C1 108 would need to traverse first to B2 104, then to C2 110.

One such professional social networking system using DoS style logic is LinkedIn™. LinkedIn™ is focused on allowing users to build a network of peers and disseminate job postings to the connections in the network. More specifically, LinkedIn™ allows users to notify people in their network (within one DoS) via email. The basis behind this type of professional social networking is having users sign up with the service and invite peers to join as "connections." Once the invited person accepts the invitation, the peers are linked to the inviting person's network. Later, the friends would invite other peers building their own networks. However, each user is permitted to have only one network. This type of professional social networking allows people to view other participants networks up to a predefined number of DoS away, provided the other user has permitted his or her network to be seen by other users. The user may then disseminate job postings to some or all the people within one DoS of the user.

The professional social networking services introduce several additional problems. First, some sites limit each user to having only one network. This means all of the users contacts or friends are all in the same network leading to unwieldy, cumbersome, and overly large networks with no way of segregating different types of friends and/or contacts. For example, there is no way to segregate business contacts from friends; they are all in the same network. This means, by using traditional DoS logic, any job listing would be shared with everyone in a user's network not just the user's business contacts. Further, some sites restrict a user to either have all of that user's contacts available or unavailable—there is no way to limit or classify which contacts will be available to other users or groups of users. This introduces the second major problem; the network cannot be used to target the job position to a particular type of person. The job posting is disseminated to all of the friends and/or contacts of a user within a certain DoS. This means the job posting is shared or blasted to people whose only qualification is being within a certain DoS from someone else. Furthermore, as the DoS increases the link to the initial person becomes tenuous—the farther away from the initial person, the less likely the recipient will be similar to and/or have a strong or meaningful relationship with the initial person. An additional problem is the lack of a way to provide users of the professional networking service to refer potential candidates. The system is limited to disseminating the job to those people who are part of the professional networking service and within a certain DoS. Yet another problem is there is no way for an employer to restrict job postings from other job post authors flowing to their network. It is common for employers to have their employees as part of their network. By allowing job postings to flow through the employer directly to their employees, the employer is allowing its employee base to be cannibalized by other job posters.

These problems amass to create an increasingly difficult and cumbersome method for employers to locate potential employees.

BRIEF SUMMARY OF THE INVENTION

There is a need for a method, system, and/or storage device that allows employers to disseminate job postings to specific people and then have those job postings disseminated through those people's networks to users that are more likely to have relationships with each other such as similarly situated persons and/or highly rated persons without the concern of cannibalizing their own workforce. There is also a need for a method, system, and/or storage device that allows employers to offer referral rewards to people who refer potential candidates and/or the candidate that is ultimately hired.

One aspect of the disclosed subject matter is allowing users to create an unlimited number of networks.

Another aspect of the disclosed subject matter is providing a referral reward system.

An additional aspect of the disclosed subject matter is the dissemination of job listings to similarly situated people taking into account both their degree of separation from the job poster and the other users they are grouped with.

An additional aspect of the disclosed subject matter is the dissemination of job listings to similarly situated people taking into account their rating.

These and other aspects of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features and advantages here provided will become apparent to one with skill in the art upon examination of the following FIGUREs and detailed description. It is intended that all such additional systems, methods, features and advantages that are included within this description, be within the scope of the accompanying claims.

BRIEF DESCRIPTIONS OF THE DRAWINGS

The features, nature, and advantages of the disclosed subject matter will become more apparent from the detailed description set forth below when taken in conjunction with the accompanying drawings, wherein:

FIG. 6 depicts a graphical view of the system recommendation process including the ratings of the PU.

DETAILED DESCRIPTION OF ILLUSTRATIVE EMBODIMENTS

Although described with reference to personal computers and the Internet, one skilled in the art could apply the principles discussed herein to any computing or mobile computing environment. Further, one skilled in the art could apply the principles discussed herein to communication mediums beyond the Internet.

Figure 1:
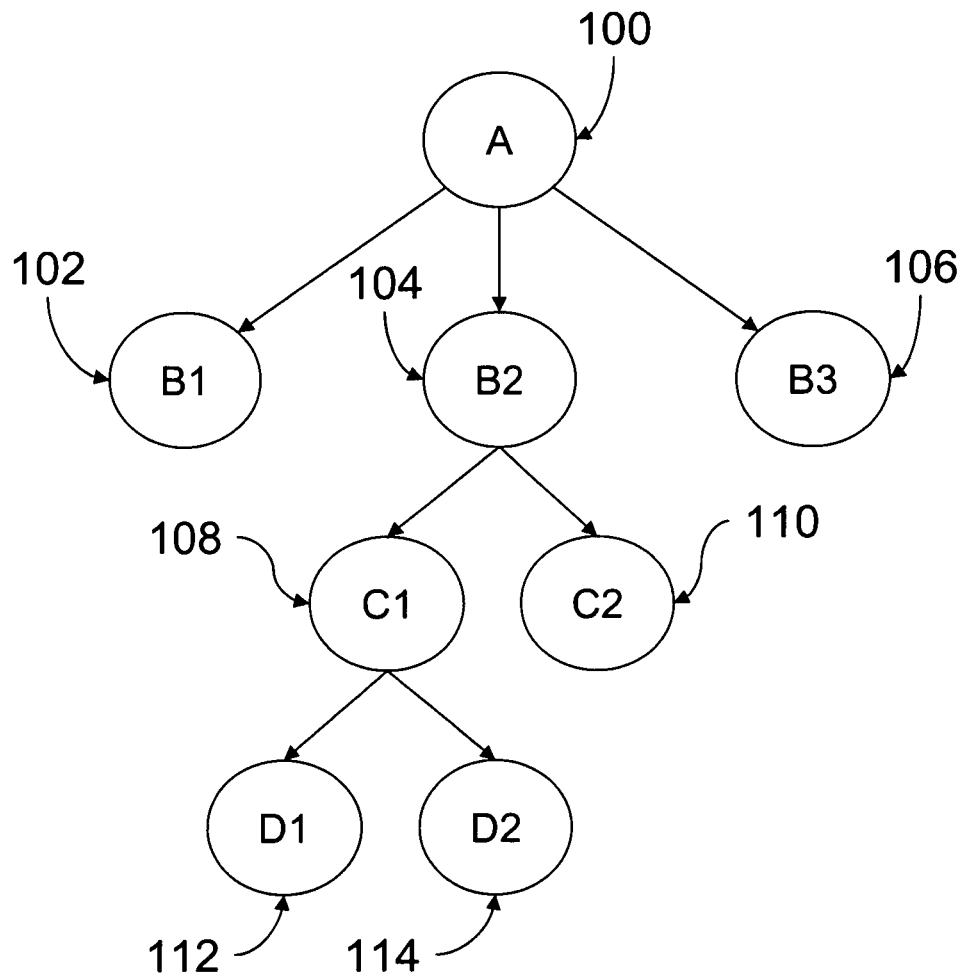
FIG. 1 depicts a graphical representation of a traditional degree of separation model.
Figure 2:
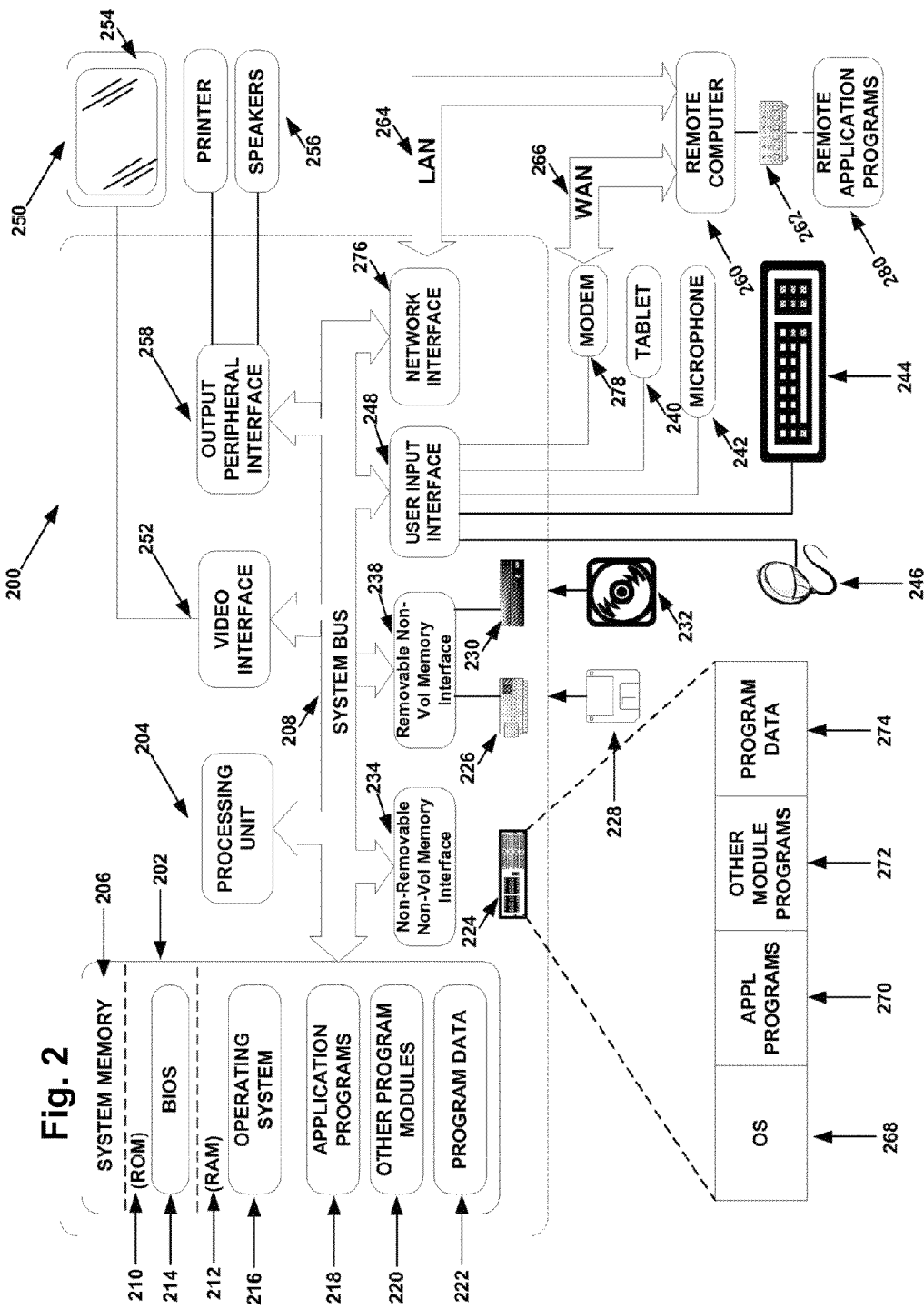
FIG. 2 illustrates a computer system and related peripherals that may operate with the job posting and matching service of the present embodiment.

With reference to FIG. 2, an exemplary system within a computing environment for implementing the invention includes a general purpose computing device in the form of a computing system 200, commercially available from Intel, IBM, AMD, Motorola, Cyrix and others. Components of the computing system 202 may include, but are not limited to, a processing unit 204, a system memory 206, and a system bus 236 that couples various system components including the system memory to the processing unit 204. The system bus 236 may be any of several types of bus structures including a memory bus or memory controller, a peripheral bus, and a local bus using any of a variety of bus architectures.

Computing system 200 typically includes a variety of computer readable media. Computer readable media can be any available media that can be accessed by the computing system 200 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data.

Computer memory includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing system 200.

The system memory 206 includes computer storage media in the form of volatile and/or nonvolatile memory such as read only memory (ROM) 210 and random access memory (RAM) 212. A basic input/output system 214 (BIOS), containing the basic routines that help to transfer information between elements within computing system 200, such as during start-up, is typically stored in ROM 210. RAM 212 typically contains data and/or program modules that are immediately accessible to and/or presently being operated on by processing unit 204. By way of example, and not limitation, an operating system 216, application programs 220, other program modules 220 and program data 222 are shown.

Computing system 200 may also include other removable/non-removable, volatile/nonvolatile computer storage media. By way of example only, a hard disk drive 224 that reads from or writes to non-removable, nonvolatile magnetic media, a magnetic disk drive 226 that reads from or writes to a removable, nonvolatile magnetic disk 228, and an optical disk drive 230 that reads from or writes to a removable, nonvolatile optical disk 232 such as a CD ROM or other optical media could be employed to store the invention of the present embodiment. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 224 is typically connected to the system bus 236 through a non-removable memory interface such as interface 234, and magnetic disk drive 226 and optical disk drive 230 are typically connected to the system bus 236 by a removable memory interface, such as interface 238.

The drives and their associated computer storage media, discussed above, provide storage of computer readable instructions, data structures, program modules and other data for the computing system 200. For example, hard disk drive 224 is illustrated as storing operating system 268, application programs 270, other program modules 272 and program data 274. Note that these components can either be the same as or different from operating system 216, application programs 220, other program modules 220, and program data 222. Operating system 268, application programs 270, other program modules 272, and program data 274 are given different numbers hereto illustrates that, at a minimum, they are different copies.

A user may enter commands and information into the computing system 200 through input devices such as a tablet, or electronic digitizer, 240, a microphone 242, a keyboard 244, and pointing device 246, commonly referred to as a mouse, trackball, or touch pad. These and other input devices are often connected to the processing unit 204 through a user input interface 248 that is coupled to the system bus 208, but may be connected by other interface and bus structures, such as a parallel port, game port or a universal serial bus (USB).

A monitor 250 or other type of display device is also connected to the system bus 208 via an interface, such as a video interface 252. The monitor 250 may also be integrated with a touch-screen panel or the like. Note that the monitor and/or touch screen panel can be physically coupled to a housing in which the computing system 200 is incorporated, such as in a tablet-type personal computer. In addition, computers such as the computing system 200 may also include other peripheral output devices such as speakers 254 and printer 256, which may be connected through an output peripheral interface 258 or the like.

Computing system 200 may operate in a networked environment using logical connections to one or more remote computers, such as a remote computing system 260. The remote computing system 260 may be a personal computer, a server, a router, a network PC, a peer device or other common network node, and typically includes many or all of the elements described above relative to the computing system 200, although only a memory storage device 262 has been illustrated. The logical connections depicted include a local area network (LAN) 264 connecting through network interface 276 and a wide area network (WAN) 266 connecting via modem 278, but may also include other networks. Such networking environments are commonplace in offices, enterprise-wide computer networks, intranets and the Internet.

For example, in the present embodiment, the computer system 200 may comprise the source machine from which data is being generated/transmitted, and the remote computing system 260 may comprise the destination machine. Note however that source and destination machines need not be connected by a network or any other means, but instead, data may be transferred via any media capable of being written by the source platform and read by the destination platform or platforms.

The central processor operating pursuant to operating system software such as IBM OS/2®, Linux®, UNIX®, Microsoft Windows®, Apple Mac OSX® and other commercially available operating systems provides functionality for the services provided by the present invention. The operating system or systems may reside at a central location or distributed locations (i.e., mirrored or standalone).

Software programs or modules instruct the operating systems to perform tasks such as, but not limited to, facilitating client requests, system maintenance, security, data storage, data backup, data mining, document/report generation and algorithms. The provided functionality may be embodied directly in hardware, in a software module executed by a processor or in any combination of the two.

Furthermore, software operations may be executed, in part or wholly, by one or more servers or a client's system, via hardware, software module or any combination of the two. A software module (program or executable) may reside in RAM memory, flash memory, ROM memory, EPROM memory, EEPROM memory, registers, hard disk, a removable disk, a CD-ROM, DVD, optical disk or any other form of storage medium known in the art. An exemplary storage medium is coupled to the processor such that the processor can read information from, and write information to, the storage medium. In the alternative, the storage medium may be integral to the processor. The processor and the storage medium may also reside in an application specific integrated circuit (ASIC). The bus may be an optical or conventional bus operating pursuant to various protocols that are well known in the art.

Figure 3:
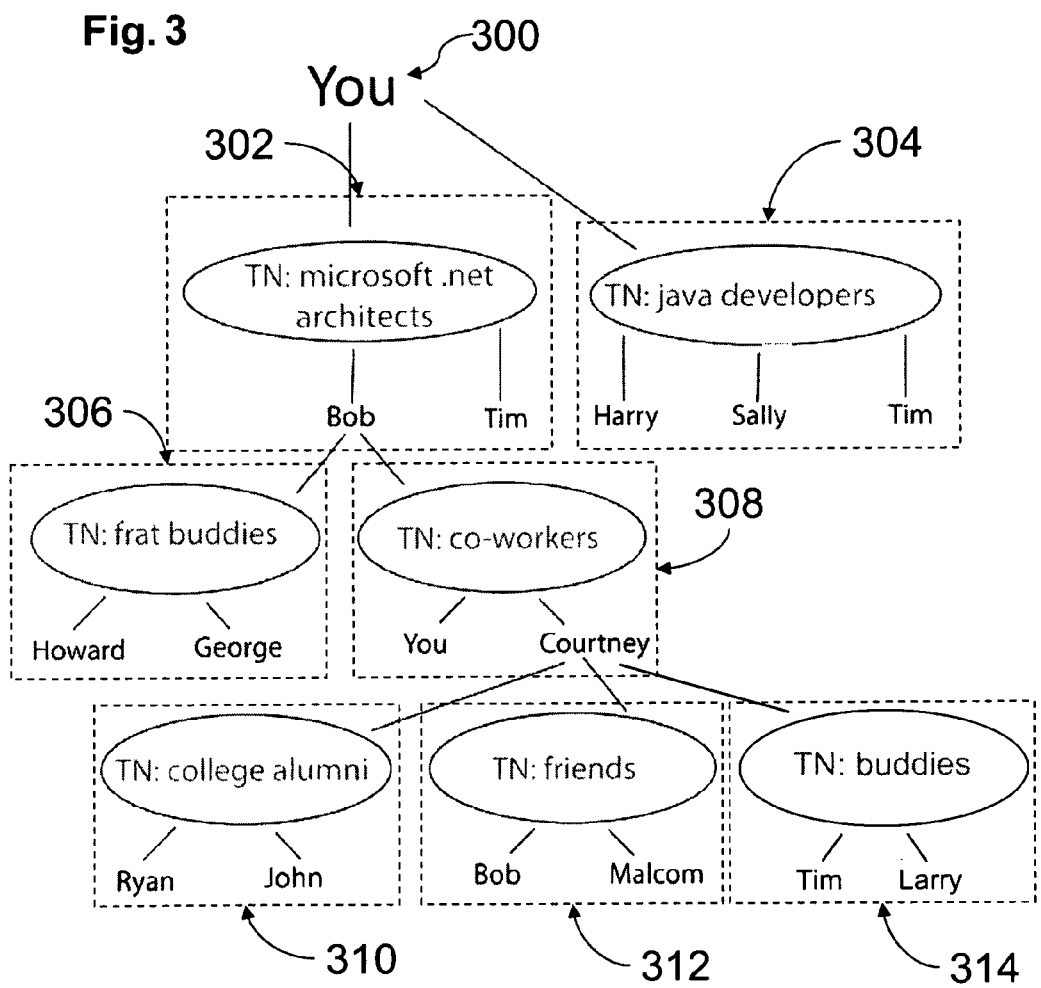
FIG. 3 depicts a graphical view of the hierarchical associations of the job posting and matching service of the present embodiment.

FIG. 3 depicts a graphical view of the hierarchical associations of the job posting and matching service of the present embodiment. The system allows users to create multiple groups of friends called Talent Networks for employers and Personal Networks for job seekers (collectively "TN"). When creating a TN, the user assigns it a unique name. The user may have any number of TNs; however, each must have a different name. After creating the TN, the user may add contacts to the TN. In order to add someone to a TN the user must already have a relationship (through the system) with that contact. To form a relationship with a contact, the inviter (the user inviting the contact to join) invites the invitee (the user being invited) to become a connection of the inviter. If the invitee is already a member of the system, the invitee only needs to accept the invitation; however, if the invitee is not a member of the system, the invitee would first be given the option of joining the system and then, after joining, could accept the invitation. Once the invitee accepts the invitation, the relationship is called a connection. The invitation notification may be by any method, but in the preferred embodiment is an email provided emails are permitted by the recipient's settings. Each TN may have any number of connections associated with it and individual connections can be assigned to multiple TNs.

Cachinko™ (a trademark of Cachinko, LLC) Degrees of Separation ("CDoS") is determined by analyzing connections and associations. As with traditional DoS, the CDoS must be analyzed with reference to one user—this user is called the Primary User ("PU"). The CDoS will be best understood by reference to specific examples. In the preferred embodiment, to be "in-network" to the PU, the user must be within the first three CDoS as described below. In alternative embodiments, different users and/or accounts could have fewer or greater levels of CDoS to be considered in-network.

$1^{st}$ CDoS

All users directly connected to the PU and assigned to one or more of the PU's talent networks are the $1^{st}$ CDoS users. Therefore, referring to FIG. 3, You 300 is the PU and Bob, Tim, Harry and Sally are all $1^{st}$ CDoS users from You 300 because each has a direct connection to You 300. $1^{st}$ CDoS users are also referred to as $1^{st}$ Degree Connections.

$2^{nd}$ CDoS

For clarity of explanation only, a complete path will be analyzed before undertaking a new path. To be a $2^{nd}$ CDoS user, the user must be associated with a TN of a $1^{st}$ CDoS user and the PU must also be associated with that same TN. Referring back to FIG. 3, for clarity of explanation Bob's path will be analyzed first. Bob has two TNs: Frat Buddies 306 and Co-Workers 308. You 300 is not associated with the Frat Buddies TN 306 and therefore neither Howard nor George are $2^{nd}$ CDoS users by virtue of the Frat Buddies TN 306; however, You 300 is associated with the Co-Workers 308 TN and therefore Courtney is a $2^{nd}$ CDoS user. It may be helpful to note that You 300 is not a $2^{nd}$ CDoS user because You 300 is the PU (a user cannot be $2^{nd}$ CDoS to that same user—put a different way, a user that already has a designation will not be re-designated as a higher designation; e.g. a 1DTU will not be re-designated as a 2DTU). $2^{nd}$ CDoS users are also referred to as $2^{nd}$ Degree Connections.

$3^{rd}$ CDoS

To be a $3^{rd}$ CDoS user, the user must be associated with a TN of a $2^{nd}$ CDoS user and the $1^{st}$ CDoS user of the path currently being analyzed must also be associated with the TN. Continuing analyzing the same path (Bob's in this example), we only analyze those sub-TNs of $2^{nd}$ CDoS users that are in-network to the PU. Here, Courtney is in You's 300 network (because she is a $2^{nd}$ CDoS user), therefore, Courtney's TNs are analyzed. Courtney has three TNs: College Alumni 310, Friends 312, and Buddies 314. Bob is the $1^{st}$ CDoS user of the path currently being analyzed; therefore, to be a $3^{rd}$ CDoS user, Bob must be associated with the TN. Bob is not associated with the College Alumni TN 310 or the Buddies TN 314, therefore, none of the users associated with those TNs are in You's 300 network by virtue of their association with those TNs; however, Bob is associated with the Friends TN 312, therefore, Malcom is a $3^{rd}$ CDoS user and in You's 300 network. Note, Bob is not "reclassified" as a $3^{rd}$ CDoS because of his association with the Friends TN 312. A user retains the user's closest designation; therefore, Bob remains a $1^{st}$ CDoS user. Note, with respect to the Buddies TN 314, it is not sufficient that Tim is a $1^{st}$ CDoS user or that Tim was in the same TN as Bob (the Microsoft.Net Architects TN 302) to make Larry a $3^{rd}$ CDoS user—the TN must contain the $1^{st}$ CDoS user of the path currently being analyzed; therefore, Larry is not within You's 300 network. $3^{rd}$ CDoS users are also referred to as $3^{rd}$ Degree Connections.

$N^{th}$ CDoS

Continuing this logic forward, to be on the $N^{th}$ CDoS, the user must be associated with a TN of a N−1 CDoS user and the N−2 CDoS user of the path currently being analyzed must also be associated with that TN.

Although discussed herein as analyzing a single path at a time, this disclosure is intended to include analyzing any number of paths serially and/or concurrently and/or in different order. In an alternative embodiment, additional criteria or users could be added to expand or contract who is included in each successive CDoS such as the Nth CDoS users are users that are associated with a N−1 CDoS User's TN where the same TN also contains at least one associated user that is: a N−2 and/or N−3 CDoS user; N−2, N−3, and/or N−4 CDoS user; any of the preceding CDoS; etc.

Figure 4:
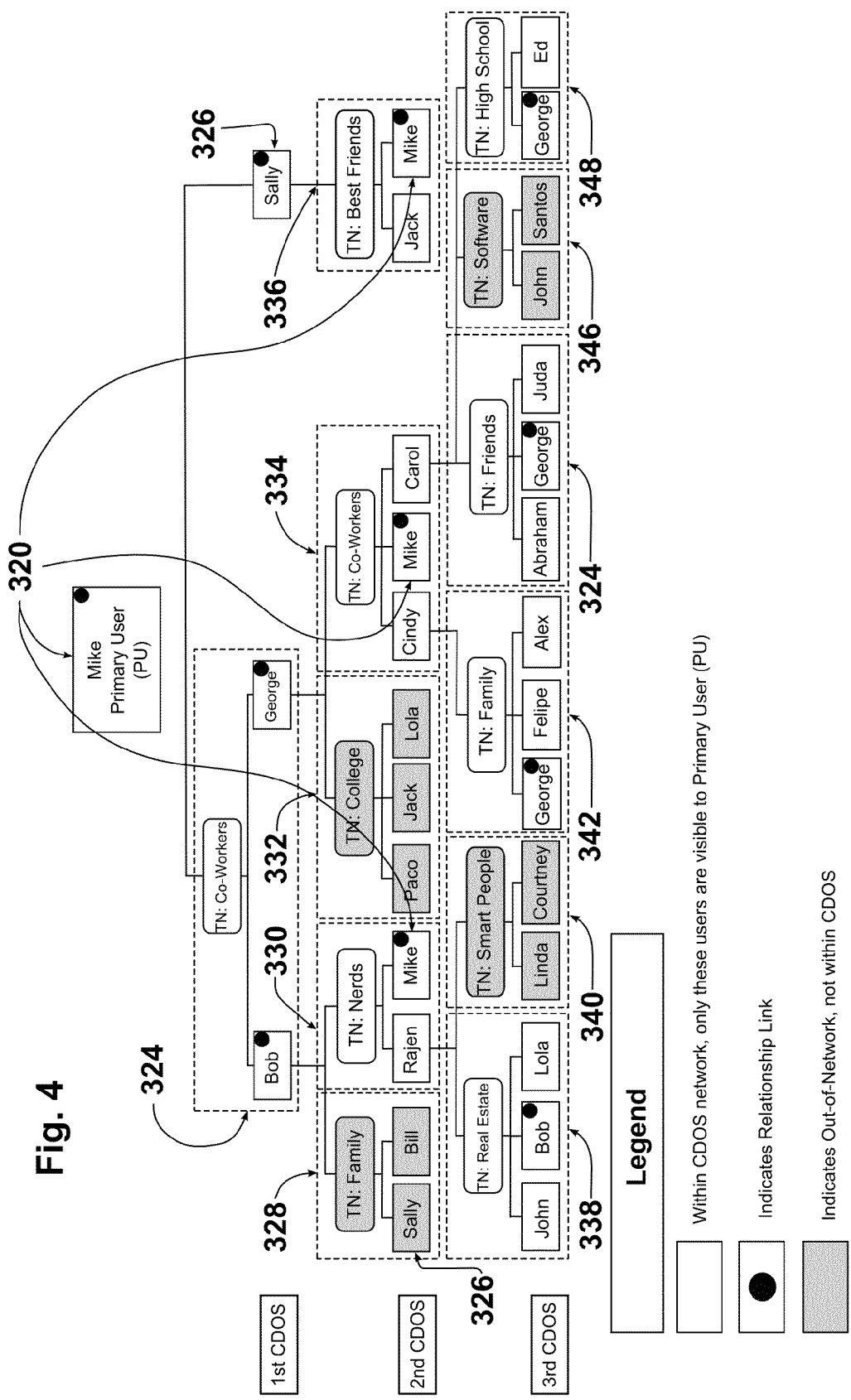
FIG. 4 depicts a graphical view of the job posting dissemination structure of the job posting and matching service of the present embodiment.

FIG. 4 depicts a more involved and detailed graphical view of the hierarchical associations and CDoS of the job posting and matching service of the present embodiment. Again the same logic for CDoS is used to analyze who is in network to the PU. Mike 320 is the PU in this example. All users directly connected to Mike 320 are $1^{st}$ CDoS users: Bob, George, and Sally 326. Again, for clarity of explanation only, each path will be fully analyzed prior to starting another path.

Bob's Path

Bob has two TNs: Family 328 and Nerds 330. Again, to be a $2^{nd}$ CDoS user, the user must be associated with a TN of a $1^{st}$ CDoS user and the PU must also be associated with that TN. Only the Nerds TN 330 also has Mike 320 (the PU) associated with it; therefore, for this path only Rajen is a $2^{nd}$ CDoS user. Continuing along Rajen's path, Rajen also has two TNs: Real Estate 338 and Smart People 340. Again, to be a $3^{rd}$ CDoS user, the user must be associated with a TN of a $2^{nd}$ CDoS user and the $1^{st}$ CDoS user of the current path must also be associated with that TN. Here, the $1^{st}$ CDoS user of the current path is Bob; therefore, Bob must also be associated with the TN. Bob is only associated with the Real Estate TN 338; therefore, for this path, only John and Lola are $3^{rd}$ CDoS users. Because there are no additional paths to take under any $2^{nd}$ CDoS user (and we are only analyzing through the $3^{rd}$ CDoS), the next $1^{st}$ CDoS user is analyzed.

George's Path

George also has only two TNs: College 332 and Co-Workers 334. Because Mike 320 (the PU) is only a member of the Co-Workers TN 334 (and not the College TN 332), only Cindy and Carol are $2^{nd}$ CDoS users. Continuing along Cindy's path, Cindy has only the Family TN 342. Here, for any of the users in the Family TN 342 to be $3^{rd}$ CDoS users, George (the $1^{st}$ CDoS user of the current path) must also be associated with the TN. Therefore, Felipe and Alex are both $3^{rd}$ CDoS users. Now the next $2^{nd}$ CDoS user will be analyzed. Continuing along Carol's path, Carol has three TNs: Friends 344, Software 346, and High School 348. Here, the $1^{st}$ CDoS user of the current path is George; therefore, George must also be associated with the TN. George is only a member of the Friends TN 344 and the High School TN 348; therefore, for this path, Abraham, Juda, and Ed are all $3^{rd}$ CDoS users. Because there are no additional paths to take under any $2^{nd}$ CDoS user (and we are only analyzing through the $3^{rd}$ CDoS), the next $1^{st}$ CDoS user is analyzed.

Sally's Path

Sally 326 only has the Best Friends TN 336. Again, to be a $2^{nd}$ CDoS user, the user must be associated with a TN of a $1^{st}$ CDoS user and the PU must also be associated with that TN. Here, Mike 320 is associated with the Best Friends TN 336; therefore, Jack is also a $2^{nd}$ CDoS user.

SUMMARY

The $1^{st}$ CDoS users are: Bob, George, and Sally. The $2^{nd}$ CDoS users are: Rajen, Cindy, Carol, and Jack. The $3^{rd}$ CDoS users are: John, Lola, Felipe, Alex, Abraham, Juda, and Ed. According to the preferred embodiment, these are all the users that are in network to Mike 320. Note: Lola is also in the College TN 332; however, because Mike 320 is not a member of the College TN 332, Lola is not included as a $2^{nd}$ CDoS user by virtue of her association in the College TN 332—she is a $3^{rd}$ CDoS user by her association with the Real Estate TN 338.

When creating a job posting, the job post author first outlines the job, which may include information such as: title, salary, travel requirements, responsibilities, qualifications, referral rewards offered, etc. Once the job posting is complete, the job post author selects which of the job poster's connections the user would like to publish the job posting to. In addition to individual connections, the job post author can publish the job posting to one or more of the job post author's TNs. For example, referring back to FIG. 4, if Mike 320 prepares a job posting and then selects the Co-Workers TN 324 and Sally 326 to receive notification of the job posting, the system will automatically disseminate the job posting (trickling down) via the CDoS logic. Therefore, if Mike 320 selected the Co-Workers TN 324 and Sally 326 to receive the notification of the job posting, then all users in Mike's 320 network would also receive the job notification: Bob, George, Sally 326, Rajen, Cindy, Carol, Jack, John, Lola, Felipe, Alex, Abraham, Juda, and Ed.

However, if Mike 320 only selected Bob and Sally 326 to receive the job notification (and not George), then Cindy, Carol, Felipe, Alex, Abraham, Juda, and Ed would no longer receive the job post notification because each of them was in Mike's 320 network by virtue of their association with George. By removing George from the initial job post notification, any user who would have otherwise received notification of the job posting by virtue of their association with George would no longer receive the notification.

In the preferred embodiment the system would not automatically disseminate job postings through an employer's account to the employer's connections thereby protecting the employer's investment in its employees. In an alternative embodiment, the employer could toggle whether to allow job postings to filter through to the employer's connections. In yet another embodiment, employers could flag individual TNs and/or users to allow or prohibit job postings from trickling down to those TNs and/or users. By allowing employer's to restrict job postings from trickling down, the employer can make connections with its employees without fear of its employee base being cannibalized because of the employer's membership to the system.

Though this example, and the preferred embodiment only discuss automatically disseminating the job posting up to three CDoS from the job post author, any fewer or greater CDoS away from the job post author is intended to be included within this disclosure.

The notification could be by: email, online alert, text message (e.g. short message service), instant message, voice message, voice mail, telephone notification, desktop widget, mobile web, etc. In the preferred embodiment, the notification would be sent via email to those contacts that requested email notification, and would be displayed in the "My Job Leads" section of each user that received the notification. In an alternative embodiment, if a job posting is renewed, then the notification is resent to all users who, at the time of the renewal, would fall within the preset number of CDoS at the time the job posting was renewed.

A person with ordinary skill in the art could expand, combine, and adapt these concepts to include or exclude additional users, tiers, CDoS, etc.

Another aspect of the disclosed subject matter is allowing users who create job postings to offer referral rewards to other users. In the preferred embodiment, there are two types of referral awards: (i) Introduction Rewards and (ii) Placement Rewards. An Introduction Reward is a sum of money paid from the employer to a user who introduces a potential candidate to the job placement author. A Placement Reward is a sum of money paid from the employer to a user who introduced the candidate who was ultimately hired, to the job placement author. In the preferred embodiment, when a job posting is made from an employer account, the job post author must provide at least an Introduction Reward and may also offer a Placement Reward. In an alternative embodiment, a job posting made from an employer account could elect to offer none, one, or more of the referral rewards. In yet another embodiment, individual users may offer one or more of the referral rewards upon making a job posting. In still another embodiment, individual users may be required to offer one or more referral awards upon making a job posting.

When a user believes the user knows a good candidate for a particular job posting, the user may refer the candidate for the job. In the preferred embodiment, the referrer (the user making the referral) must be within two CDoS of the employer; the referee (the user being referred) must be within one CDoS of the referrer; and the referee must be within three DoS of the employer. Further, users are limited in the number of referrals they may make per job post to keep the referrals of a high quality. Also in the preferred embodiment, if the referrer is a $2^{nd}$ CDoS user of the employer then any referral awards would be split with the $1^{st}$ CDoS user immediately upstream from the referrer. If there were multiple $1^{st}$ CDoS users immediately upstream from the referrer (e.g. there are multiple $1^{st}$ CDoS users that have the referrer as a connection and that, by virtue of that connection, the referrer is in network to the employer) the referrer would choose a $1^{st}$ CDoS user to split the referral with. In an alternative embodiment, the referral award would be split amongst all the $1^{st}$ CDoS users immediately upstream from the referrer.

The system would notify the referee (person being referred) (in the preferred embodiment, this notification is via an email and/or an online notation in the referee's account) explaining the referee has been referred for a job posting. If the referee was not already a member of the system, the referee would be invited to join the system. If the referee was already a member of the system, or signed up in response to the referral notification, the referee could then review the job posting and choose to move forward with the referral or not. In an alternative embodiment, the referee would not be queried as to whether the referee wanted to move forward with the referral. If the candidate chose to move forward, the job post author would receive notification of the potential recommendation. The job post author would be able to review certain non-identifying information about the potential candidate. Such non-identifying information could include: experience, past employers, current employment status, education, desired salary, number of times the potential candidate has been recommended for a job, number of times and percentage of success that the recommending user has recommended candidates, etc.; however, the last name, contact information, and/or other identifiable information of the potential candidate would be withheld from the job post author at this time. In an additional embodiment, the job post author could require the referee to answer a questionnaire that would also be provided to the job post author. After the job post author reviewed the potential candidate's non-identifiable information and/or questionnaire, the job post author could either accept the referral or reject the referral. If the job post author rejects the referral, no payment is made to the referrer (the user making the referral) and the job post author does not receive any of the potential candidate's identifiable (e.g. contact) information. If the job post author accepts the referral, the referrer is immediately paid the Introduction Reward and the referee's identifiable information is released to the job post author.

The Placement Reward is similar to the Introduction Reward except that the Placement Reward is only paid if the referee was actually hired for the position. If the referee was hired, the Placement Reward would be paid to the referrer; otherwise, no payment is made. In the preferred embodiment, the job post author would log into their account and indicate whether the referee was hired and if so, pay the referrer.

In the preferred embodiment, the money transfer is handled through PayPal™; however, in an alternative embodiment any monetary exchange system or method could be used to effectuate the reward transfer. Though the referral rewards are discussed herein as payments of money, any other form of reward or incentive could be used.

The system will also provide users the opportunity to rate other users and job postings. In the preferred embodiment the rating system would have five levels ranging from "poor" to "hot" for a job posting and from "poor" to "top" for a contact or potential job candidate. In the preferred embodiment, users will be able to see an average rating for a particular user or job posting, but users will not be able to view how other individual users have rated a particular user or job posting. A user may change or clear a rating for a user or job posting at any time.

Figure 5:
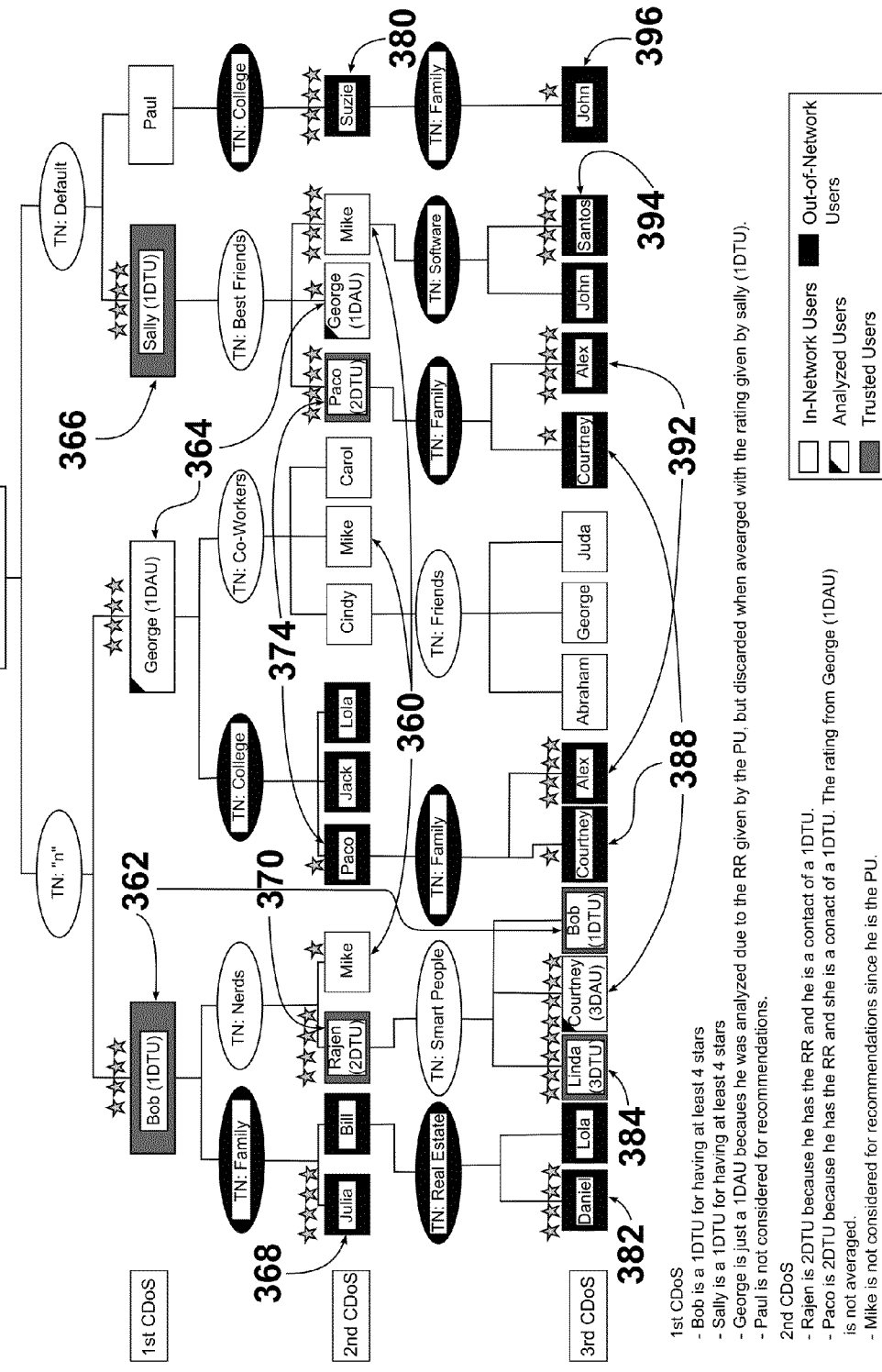
FIG. 5 depicts a graphical view of the system recommendation process.

FIG. 5 depicts a graphical view of the system recommendation process. When an employer (or in an alternative embodiment, when a job seeker) is searching for a job candidate, all candidates that match the employer's search criteria will be analyzed by the system according to the ratings that each potential job candidate has been given by certain users in order to decide which of those candidates to recommend to the employer. In the preferred embodiment, only users that are in-network are analyzed for the recommendation process; however, in alternative embodiments out-of-network and/or a combination could be searched. An example of the preferred embodiment recommendation process from a job post author's perspective is shown in FIG. 5. Referring to FIG. 5, the PU (Mike in this example) 360 is the user who conducted the search looking for potential job candidates and therefore all references to CDoS users are from the PU's (Mike in this example) 360 perspective. The stars above a user's name represent the rating given to that user from the user immediately upstream. For example, George 364 was rated by PU (Mike in this example) 360 as 4 but rated by Sally 366 as a 1.

For FIG. 5, the following table of definitions has been included for clarity.

| | | |
|---|---|---|
| PU | Primary User | The User that executed the search, and is requesting the results. This person will obtain the system recommendations for the search he or she is performing. |
| UR | User Rating | Any rating assigned by a user (the "assigning user") to another user that is a $1^{st}$ CDoS user of the assigning user. NOTE: in the preferred embodiment any user may rate any other user in the system; however, for clarity, the above definition has been employed throughout FIG. 5. |
| RR | Required Rating | The threshold rating that is required to be recommended. |
| 1DAU | $1^{st}$ Degree Analyzed User | Any $1^{st}$ CDoS user that has a UR from the PU that equals or exceeds the RR. |
| 2DAU | $2^{nd}$ Degree Analyzed User | Any $2^{nd}$ CDoS user that has a UR from at least one of the immediately preceding 1DTU(s) that equals or exceeds the RR. |
| 3DAU | $3^{rd}$ Degree Analyzed User | Any $3^{rd}$ CDoS user that has a UR from at least one of the immediately preceding 2DTU(s) that equals or exceeds the RR. |
| 1DCAU | $1^{st}$ Degree Currently Analyzed User | The 1DAU that the system is currently analyzing. |
| 2DCAU | $2^{nd}$ Degree Currently Analyzed User | The 2DAU that the system is currently analyzing. |
| 3DCAU | $3^{rd}$ Degree Currently Analyzed User | The 3DAU that the system is currently analyzing. |
| 1DTU | $1^{st}$ Degree Trusted User | A $1^{st}$ CDoS user that is marked by the system for recommendation. |
| 2DTU | $2^{nd}$ Degree Trusted User | A $2^{nd}$ CDoS user that is marked by the system for recommendation. |
| 3DTU | $3^{rd}$ Degree Trusted User | A $3^{rd}$ CDoS user that is marked by the system for recommendation. |

For each search executed, the system performs the following steps in order to decide whether or not to recommend the contacts obtained during the search.

Identify $1^{st}$ Degree Trusted Users (1DTU)
If the 1DCAU of the PU has a rating equal to or greater than the RR AND if no other 1DAU has a UR for the 1DCAU, then the 1DCAU becomes a 1DTU;
ELSE IF
If the average ("AVG") of (1DAUs UR of 1DCAU plus the PU's UR of the 1DCAU) is equal to or greater than the RR and if no other 2DAU has a UR for the 1DCAU, then the 1DCAU becomes a 1DTU;
ELSE IF
If the AVG of (2DAUs UR of 1DCAU plus 1DAUs UR of the 1DCAU plus the PU's UR of the 1DCAU) is equal to or greater than the RR then the 1DCAU becomes a 1DTU.

Therefore, in this example, Bob 362 and Sally 366 are both 1DTUs because both are 1st CDoS users from Mike 360, have an overall ranking above the RR, and are not ranked by any other 1DAU. Whereas, George 364 is a 1DAU because George's 364 rating did not exceed the RR: the average of the rating given by Mike 360 (a rating of 4) and the rating given by Sally 366 (a rating of 1). Note, George's 364 TNs are not duplicated below Sally 366 in this example merely for clarity.
Identify $2^{nd}$ Degree Trusted Users (2DTU)
If the 2DCAU has a rating equal to or greater than the RR AND if no other 2DAU or 1DTU has a UR for the 2DCAU, then the 2DCAU becomes a 2DTU;
ELSE IF
If the AVG of (2DAUs UR of 2DCAU plus the 1DTUs UR of the 2DCAU) is equal to or greater than the RR then the 2DCAU becomes a 2DTU.

Therefore, in this example, Rajen 370 is a 2DTU because his rating from Bob 362 (who is a 1DTU) equal to or greater than the RR and Rajen 370 is not ranked by any other 2DAU or 1DTU. Paco 374 is also a 2DTU because Sally's 366 (who is a 1DTU) rating equal to or greater than the RR and Paco 374 is not ranked by any other 2DAU or 1DTU. George's 364 rating of Paco 374 is not averaged into Paco's 374 score because George 364 is a 1DAU and not a 2DAU or 1DTU. Note, Mike 360 is not reclassified as a 2DAU because of the ratings he received from Sally 366 and Bob 362, Mike 360 retains his original designation as the PU. Note, Julia 368 receives no designation even though she has a rating in excess of the RR from Bob 362 (who is a 1DTU) because Julia 368 is not in Mike's 360 network.
Identify $3^{rd}$ Degree Trusted Users (3DTU)
If the 3DCAU has a rating equal to or greater than the RR AND if no other 2DTU or 1DTU has a UR for the 3DCAU, then the 3DCAU becomes a 3DTU;
ELSE IF
If the AVG of (2DTUs UR of 3DCAU plus the 1DTUs UR of the 3DCAU) is equal to or greater than the RR then the 3DCAU becomes a 3DTU.

Therefore, in this example, Linda 384 is a 3DTU because she was rated in excess of the RR by Rajen 370 (a 2DTU) and no other 2DTUs or 1DTUs. Courtney 388 is only a 3DAU because Courtney 388 was rated 4 by Rajen 370 (a 2DTU) and rated 1 by Paco 374 (a 2DTU) which averages to a 2.5 which is below the RR. Finally, Abraham, George, and Juda receive no designations because they did not receive ratings from a 2DTU or 1DTU. Note, Daniel 382, Alex 392, Santos 394, and John 396 are not analyzed because they are not in Mike's 360 network.

In the preferred embodiment the RR is 3.5 out of 5; however, in an alternative embodiment the RR is any number between the lowest and highest rating. In yet another embodiment, the user performing the search can set the RR to any value between the lowest and highest rating. Though the ranking system and recommendation system are discussed with reference to a five level rating system, this disclosure is intended to include fewer or greater rating levels. Further, in the preferred embodiment, multiple ratings are averaged using a simple average; however, in alternative embodiments other averaging methods may be used (e.g. median, mode, weighted average, etc.). Additionally, alternative weighting could be employed, such as: PU rating having the most weight; weight reducing in proportion to DoS from PU; weight reducing in proportion to CDoS from PU; one weight for trusted users and a lower weight for analyzed users; etc. Note, in the preferred embodiment the above calculations are conducted in real time therefore, any change will cause a "recalculation" of the recommendations; however, in an alternative embodiment the above calculations are conducted at pre-determined intervals and/or times.

As discussed briefly previously, any user may rate any other user in the system. With regard to FIG. 5, only the rating of the immediately preceding user was shown and used for calculations in order to reduce clutter and complication in explanation. The preferred embodiment, however, also takes into account the PU's rating of each user.

FIG. 6 depicts a graphical view of the system recommendation process including the ratings of the PU. As previously denoted, Sally 412 is a 1DTU because she has a UR from Mike (PU) 410 greater then the RR and is not rated by a 1DAU. Continuing from Sally 412, Paco 414 has received a four UR from both Sally 412 and Mike 410; therefore, Paco is a 2DTU because his average rating from both Sally 412 and Mike 410 exceeds the RR. Fred 416 is a 2DAU because he received a four UR from Sally 412, but his average UR from Sally 412 and Mike 410 is not greater or equal to the RR (6/2=3). Finally, because Larry 418 did not receive a UR that was equal to or greater than the RR from either Sally 412 or Mike 410, he is not analyzed. Note: Mike's 410, Paco's 414, Fred's 416, and Larry's 418 respective connections (if any) are not reproduced under Sally 412 (or elsewhere in FIG. 6) to enhance clarity and reduce clutter. Alternative embodiments include also accounting for: all trusted user's ratings; all analyzed user's ratings; all user's ratings; and combinations and limitations of the foregoing.

Finally, in the preferred embodiment, the system marks for recommendations all 1DTUs, 2DTUs and 3DTUs, displaying them on the top of the results page (if they also match the criteria searched by the user) and separating them from all the other search results. Additionally, in the preferred embodiment, the employer is shown the rating the employer gave the candidate and the $1^{st}$ CDoS user that has a connection to the recommended candidate. In an alternative embodiment, the recommended candidates are displayed in order of their calculated recommendation rating, from highest to lowest, and the remaining candidates follow. In yet another embodiment, the employer is shown the calculated recommendation rating with or without the rating the employer gave the candidate.

Though discussed here with specific reference to three levels and specific logic on determining which users to recommend, one skilled in the art could use this disclosure to combine and modify the foregoing to expand, contract, or otherwise fine tune the number and quality of the recommendations. Furthermore, although described above with reference to the CDoS, a person skilled in the art could modify, expand, or contract the logic to include or exclude additional users (e.g. using a combination of DoS and CDoS).

Although the foregoing discussion on recommendations referenced the recommendation system for employers searching and/or the system automatically providing for job candidates, the same disclosure can be applied to recommend job postings and/or job candidates to any users, and this disclosure is intended to include such. Similarly, although the foregoing discussion on recommendations referenced searching, the same disclosure can be applied to the system automatically providing recommended job candidates or job postings. In the preferred embodiment, job posts rated greater than or equal to the RR by Trusted User(s) will be recommended. In an alternative embodiment, job posts rated greater than or equal to the RR by in network user(s) will be recommended.

Those with skill in the arts will recognize that the disclosed embodiments have relevance to a wide variety of areas in addition to those specific examples described herein.

All references, including publications, patent applications, and patents, cited herein are hereby incorporated by reference to the same extent as if each reference were individually and specifically indicated to be incorporated by reference and were set forth in its entirety herein.

What is claimed is:

1. A method for clique based social networking and social graphing, the method executed on a processor and comprising:
    enrolling a plurality of users;
    permitting any of said plurality of enrolled users to create a plurality of networks, each said network associated to at least one particular user;
    requiring said users to associate at least one other user to each said network;
    permitting said users to associate at least one other network to each said network, wherein said at least one other user associated to said network may also create a plurality of networks;
    storing said users, said networks, and said user's associations to said networks on a database system, said database system implemented on a non-transitory storage medium on a computing system;
    designating one said user as a primary user;
    identifying said primary user's in-network users according to a set of rules, said set of rules including:
        marking, by said computing system, in said database system as a first degree connection to said primary user all said users associated with at least one of said primary user's said networks; and
        marking, by said computing system, in said database system all said first degree connections as in-network connections to said primary user;
        marking, by said computing system, in said database system as a second degree connection to said primary user:
            each said user associated with at least one of said first degree connection's networks where said primary user is also associated to the same said network; and
            said user is not said primary user or marked as one of said first degree connections; and
        marking, by said computing system, in said database system all said second degree connections as in-network connections to said primary user;
    disseminating information from said primary user to said in-network connections.

2. The method of claim 1, wherein said information is a job posting and additionally including the steps of:
    accepting said job posting from said primary user;
    storing said job posting in said database system;
    designating one or more of said primary user's in-network connections to receive said job posting;
    sharing said job posting to said designated in-network connections;
    sharing said job posting to said primary user's said in-network connections that are said in-network connections by virtue of at least one of said designated in-network connections.

3. The method of claim 2, additionally including at least one of the following steps:
    paying an introduction reward to a referrer user when said primary user accepts a referred person, said referred person referred by said referrer user;
    paying a placement reward to said referrer user when said primary user hires said referred person.

4. The method of claim 2, additionally including the steps of:
    accepting at least one ranking from said user, said ranking assigned to a particular user;
    storing said ranking in said database system;
    calculating a combined ranking from all of said user's rankings assigned to said particular user;
    marking, by said computing system, in said database system said particular user as a recommended user when said particular user's combined ranking meets or exceeds a predefined required rating and said particular user is marked as one of said first degree connections;
    marking, by said computing system, in said database system said particular user as a recommended user when said particular user's combined ranking meets or exceeds a predefined required rating, said particular user is marked as one of said second degree connections, and said particular user is immediately downstream from one or more of said recommended user.

5. The method of claim 1, additionally including the steps of:
   flagging one or more said users as an employer in said database system;
   accepting a job posting from said primary user;
   storing said job posting in said database system;
   designating one or more of said primary user's in-network connections to receive said job posting;
   sharing said job posting to said designated in-network connections;
   sharing said job posting to said primary user's said in-network connections that are said in-network connections by virtue of at least one of said designated in-network connections and are not flagged as said employer.

6. The method of claim 5, additionally including at least one of the following steps:
   paying an introduction reward to a referrer user when said primary user accepts a referred person, said referred person referred by said referrer user;
   paying a placement reward to said referrer user when said primary user hires said referred person.

7. The method of claim 5, additionally including the steps of:
   accepting at least one ranking from said user, said ranking assigned to a particular user;
   storing said ranking in said database system;
   calculating a combined ranking from all of said user's rankings assigned to said particular user;
   marking, by said computing system, in said database system said particular user as a recommended user when said particular user's combined ranking meets or exceeds a predefined required rating and said particular user is marked as one of said first degree connections;
   marking, by said computing system, in said database system said particular user as a recommended user when said particular user's combined ranking meets or exceeds a predefined required rating, said particular user is marked as one of said second degree connections, and said particular user is immediately downstream from one or more of said recommended users.

8. The method of claim 1, said set of rules including:
   marking, by said computing system, in said database system as a third degree connection to said primary user:
      each said user associated with at least one of said second degree connection's networks where said first degree connection is an immediately upstream first degree connection and is also associated to the same said network; and
      said user is not said primary user, marked as one of said first degree connections, or marked as one of said second degree connections; and
   marking, by said computing system, in said database system all said third degree connections as said in-network connections.

9. The method of claim 8, additionally including the steps of:
   accepting a job posting from said primary user;
   storing said job posting in said database system;
   designating one or more of said primary user's in-network connections to receive said job posting;
   sharing said job posting to said designated in-network connections;
   sharing said job posting to said primary user's said in-network connections that are said in-network connections by virtue of at least one of said designated in-network connections.

10. The method of claim 9, additionally including at least one of the following steps:
    paying an introduction reward to a referrer user when said primary user accepts a referred person, said referred person referred by said referrer user;
    paying a placement reward to said referrer user when said primary user hires said referred person.

11. The method of claim 9, additionally including the steps of:
    accepting at least one ranking from said user, said ranking assigned to a particular user;
    storing said ranking in said database system;
    calculating a combined ranking from all of said user's rankings assigned to said particular user;
    marking, by said computing system, in said database system said particular user as a recommended user when said particular user's combined ranking meets or exceeds a predefined required rating and said particular user is marked as one of said first degree connections;
    marking, by said computing system, in said database system said particular user as a recommended user when said particular user's combined ranking meets or exceeds a predefined required rating, said particular user is marked as one of said second degree connections, and said particular user is immediately downstream from one or more of said recommended users;
    marking, by said computing system, in said database system said particular user as a recommended user when said particular user's combined ranking meets or exceeds a predefined required rating, said particular user is marked as one of said third degree connections, and said particular user is immediately downstream from one or more of said recommended users.

12. The method of claim 8, additionally including the steps of:
    flagging one or more said users as an employer in said database system;
    accepting a job posting from said primary user;
    storing said job posting in said database system;
    designating one or more of said primary user's in-network connections to receive said job posting;
    sharing said job posting to said designated in-network connections;
    sharing said job posting to said primary user's said in-network connections that are said in-network connections by virtue of at least one of said designated in-network connections and are not flagged as said employer.

13. The method of claim 12, additionally including at least one of the following steps:
    paying an introduction reward to a referrer user when said primary user accepts a referred person, said referred person referred by said referrer user;
    paying a placement reward to said referrer user when said primary user hires said referred person.

14. The method of claim 12, additionally including the steps of:
    accepting at least one ranking from said user, said ranking assigned to a particular user;
    storing said ranking in said database system;

calculating a combined ranking from all of said user's rankings assigned to said particular user;

marking, by said computing system, in said database system said particular user as a recommended user when said particular user's combined ranking meets or exceeds a predefined required rating and said particular user is marked as one of said first degree connections;

marking, by said computing system, in said database system said particular user as a recommended user when said particular user's combined ranking meets or exceeds a predefined required rating, said particular user is marked as one of said second degree connections, and said particular user is immediately downstream from one or more of said recommended users;

marking, by said computing system, in said database system said particular user as a recommended user when said particular user's combined ranking meets or exceeds a predefined required rating, said particular user is marked as one of said third degree connections, and said particular user is immediately downstream from one or more of said recommended users.

15. The method of claim 1, said set of rules including:

marking, by said computing system, in said database system as a fourth degree connection to said primary user:
each said user associated with at least one of said third degree connection's networks where said second degree connection is an immediately upstream second degree connection and is also associated to the same said network; and
said user is not said primary user, marked as one of said first degree connections, marked as one of said second degree connections, or marked as one of said third degree connections; and marking, by said computing system, in said database system all said fourth degree connections as said in-network connections.

16. The method of claim 1, wherein said users are registered users.

17. The method of claim 1, wherein said users are non-virtual items.

18. The method of claim 1, wherein said computing system is a distributed system.

19. The method of claim 1, wherein said in-network connections are visible to said primary user.

20. The method of claim 1, wherein said primary user is not required to have all in-network connections in a single network.

21. The method of claim 1, wherein at least one of said networks is dynamically created by said computing system.

22. The method of claim 21, wherein said dynamically created network is created by said computing system in response to search criteria.

23. The method of claim 1, wherein at least one of said networks is dynamically created by or in response to a third party system.

24. The method of claim 1, wherein at least one of said users is suggested to said primary user by said computing system and/or a third party system.

25. The method of claim 1, wherein one or more users are automatically added and/or removed from one or more networks by said computing system.

26. The method of claim 1, wherein said primary user may designate one or more of said primary user's said networks as publically accessible.

27. The method of claim 1, additionally comprising permitting said primary user to share and/or transfer one or more of said primary user's networks to one or more other users.

28. The method of claim 1, with the additional step of permitting said primary user to make one or more of said primary user's said networks and/or said users associated with said primary user's said networks accessible to at least another of:
said primary user's said networks; and/or
said users associated with said primary user's said networks.

29. The method of claim 1, wherein said information is a posting and additionally including the steps of:
receiving said posting from said primary user;
storing said posting in said database system;
designating one or more of said primary user's networks and/or one or more of said users in said primary user's networks to receive said posting;
making accessible said posting to said one or more designated networks and/or one or more of said users in said primary user's networks.

30. The method of claim 1, wherein said information is a posting and additionally including the steps of:
receiving said posting from one of said users;
storing said posting in said database system;
wherein said computing system provides access to said posting to at least one of said other users automatically.

31. The method of claim 29, wherein said posting is one or more of a photo, a link, a video, an article, a comment, an audio recording, a message, an advertisement, a reward, a recognition, a question, or a suggestion.

32. The method of claim 1, wherein a company account can be flagged as one of said users and at least one of said other users is permitted to be associated with said company account and said at least one of said other users is granted at least some rights to administer said company account.

33. The method of claim 1, wherein said primary user receives a reward, recognition, and/or a payment for sharing the information of said users associated with one or more of said primary user's said networks or said in-network connections.

34. The method of claim 1, additionally comprising receiving a list of users from said primary user or a third party system and creating one or more networks populated from said list.

35. The method of claim 1, wherein said information is a posting and additionally including the steps of:
receiving said posting from one of said users;
storing said posting in said database system;
wherein said computing system provides access to said posting to at least one of said other users automatically.

36. The method of claim 1, with the additional steps of:
receiving a request from at least one of said users to associate with at least one of said networks, said request originating from a link, a button, or a widget appearing on a third party computing system, wherein said link, said button, or said widget is linked to at least one of said primary user's said networks; and
adding said requesting user to said primary user's said network.

37. The method of claim 1, with the additional steps of:
receiving a request from at least one of said users, said request originating from a link, a button, or a widget appearing on a third party computing system; and
either:
adding said requesting user to at least one of said existing networks; or
said computing system dynamically creating a new network and adding said requesting user to said new network.

38. The method of claim 1, with the additional steps of:
receiving third party system content relating to said primary user, said primary user's said networks, and/or said users associated with said primary user's said networks; and/or
transmitting information and/or content relating to said primary user, said primary user's said networks, and/or said users associated with said primary user's said networks with one or more third party systems.

39. The method of claim 1, additionally comprising permitting said primary user to filter information and/or content of said users and/or networks.

40. The method of claim 1, additionally comprising the steps of:
rating said primary user based on said primary user's interaction and behavior with the computing system; and/or
rating said primary user based on the interaction and behavior with the computing system of said users associated with said primary user's networks.

41. The method of claim 1, additionally comprising rating one or more of said networks based on the interaction and behavior with the computing system of said users associated with said network.

42. A non-transitory computer readable medium, said medium encoded with a program for clique based social networking and social graphing, said program comprising the steps:
enrolling a plurality of users;
permitting each of said users to create a plurality of networks, each said network belonging to at least one particular user;
requiring said users to associate at least one other user to each said network, wherein said at least one other user associated to said network may also create a plurality of networks;
permitting said users to associate at least one other network to each said network;
designating one said user as a primary user;
identifying said primary user's in-network users according to a set of rules, said set of rules including:
marking as a first degree connection to said primary user all said users associated with at least one of said primary user's said networks;
marking as a second degree connection to said primary user:
each said user associated with at least one of said first degree connection's networks where said primary user is also associated to the same said network; and
said user is not said primary user or marked as one of said first degree connections;
marking as a third degree connection to said primary user:
each said user associated with at least one of said second degree connection's networks where said first degree connection is an immediately upstream first degree connection and is also associated to the same said network; and
said user is not said primary user, marked as one of said first degree connections, or marked as one of said second degree connections;
marking all said first degree connections, said second degree connections, and said third degree connections as in-network connections to said primary user; and
disseminating information from said primary user to said in-network connections.

43. The medium of claim 42, additionally including the steps of:
accepting at least one ranking from said user, said ranking assigned to a particular user;
calculating a combined ranking from all of said user's rankings assigned to said particular user;
marking said particular user as a recommended user when said particular user's combined ranking meets or exceeds a predefined required rating and said particular user is marked as one of said first degree connections;
marking said particular user as a recommended user when said particular user's combined ranking meets or exceeds a predefined required rating, said particular user is marked as one of said second degree connections, and said particular user is immediately downstream from one or more of said recommended users;
marking said particular user as a recommended user when said particular user's combined ranking meets or exceeds a predefined required rating, said particular user is marked as one of said third degree connections, and said particular user is immediately downstream from one or more of said recommended users.

44. An apparatus for clique based social networking and social graphing, said apparatus comprising:
an enrolling interface, said enrolling interface receiving information to enroll a plurality of users;
a database system, said database system implemented on a computing system and storing a plurality of networks, wherein at least one of said users is associated with each said network, wherein said at least one of said users associated to said network may also create a plurality of networks; each said network belonging to a particular user, wherein said particular user is one of said users, and wherein said users are permitted to associate at least one other network to each said network;
a marking system, said marking system implemented on said computing system and capable of performing the steps of:
designating one of said users as a primary user;
identifying said primary user's in-network users according to a set of rules, said set of rules including:
marking in said database system as a first degree connection to said primary user all said users associated with at least one of said primary user's said networks;
marking in said database system as a second degree connection to said primary user:
each said user associated with at least one of said first degree connection's networks where said primary user is also associated to the same said network; and
said user is not said primary user or marked as one of said first degree connections;
marking in said database system as a third degree connection to said primary user:
each said user associated with at least one of said second degree connection's networks where said first degree connection is an immediately upstream first degree connection and is also associated to the same said network; and
said user is not said primary user, marked as one of said first degree connections, or marked as one of said second degree connections;
marking in said database system all said first degree connections, said second degree connections, and said third degree connections as in-network connections to said primary user;

storing all said first degree connections, said second degree connections, and said third degree connections in said database system; and disseminating information from said primary user to said in-network connections.

45. The apparatus of claim 44, said apparatus additionally including a ranking system, said ranking system implemented on said computing system and capable of performing the steps of:

accepting at least one ranking from said user, said ranking assigned to a particular user;

storing said ranking in said database system;

calculating a combined ranking from all of said user's rankings assigned to said particular user;

marking in said database system said particular user as a recommended user when said particular user's combined ranking meets or exceeds a predefined required rating and said particular user is marked as one of said first degree connections;

marking in said database system said particular user as a recommended user when said particular user's combined ranking meets or exceeds a predefined required rating, said particular user is marked as one of said second degree connections, and said particular user is immediately downstream from one or more of said recommended user;

marking in said database system said particular user as a recommended user when said particular user's combined ranking meets or exceeds a predefined required rating, said particular user is marked as one of said third degree connections, and said particular user is immediately downstream from one or more of said recommended user.

\* \* \* \* \*

UNITED STATES PATENT AND TRADEMARK OFFICE
CERTIFICATE OF CORRECTION

PATENT NO. : 8,489,517 B2  
APPLICATION NO. : 12/414291  
DATED : July 16, 2013  
INVENTOR(S) : Rajen Savjani et al.

Page 1 of 1

It is certified that error appears in the above-identified patent and that said Letters Patent is hereby corrected as shown below:

In the Claims

Col. 14, lines 33-34, Col. 19, lines 66-67 and Col. 21, lines 4-5

"disseminating information from said primary user to said in-network connections"

to read

"disseminating information from said primary user to only said in-network connections."

Signed and Sealed this  
Twenty-fifth Day of August, 2015

Michelle K. Lee  
*Director of the United States Patent and Trademark Office*